United States Patent [19]
Trostler

[11] 3,982,098
[45] Sept. 21, 1976

[54] HEATER AND CONTROL SYSTEM

[76] Inventor: Richard M. Trostler, 1730 Woodbend Drive, Claremont, Calif. 91711

[22] Filed: Dec. 23, 1974

[21] Appl. No.: 535,557

[52] U.S. Cl. ............................. 219/501; 174/52 PE; 219/505; 219/528; 219/530; 219/217
[51] Int. Cl.² ........................................ H05B 1/02
[58] Field of Search ................ 174/52 PE; 219/217, 219/341, 345, 501, 505, 527, 528, 530, 535

[56] References Cited
UNITED STATES PATENTS

| | | | |
|---|---|---|---|
| 3,041,441 | 6/1962 | Elbert et al. | 219/345 |
| 3,098,950 | 7/1963 | Geshner | 174/52 PE X |
| 3,173,419 | 3/1965 | Dubilier et al. | 219/527 X |
| 3,178,560 | 4/1965 | Mapp et al. | 219/528 |
| 3,616,533 | 11/1971 | Heap et al. | 174/52 PE X |
| 3,657,517 | 4/1972 | Hoyt | 219/535 |
| 3,699,394 | 10/1972 | Schuler | 174/52 PE X |
| 3,780,262 | 12/1973 | Rudd | 219/341 |
| 3,790,753 | 2/1974 | Miller | 219/528 |
| 3,803,386 | 4/1974 | Rodrigues | 219/528 X |
| 3,819,905 | 6/1974 | Trostler | 219/501 |

*Primary Examiner*—Volodymyr Y. Mayewsky
*Attorney, Agent, or Firm*—John E. Wagner

[57] ABSTRACT

A heater for water beds, and a heater control system for the heater, with the control system located in the same structure envelope that houses the heater elements. The control system has temperature sensing elements packaged together with power supply circuitry and utilizes heat sinks to thermally isolate the temperature sensing elements. The control system includes circuitry to prevent the heater from overheating under any conditions, and the heater itself is a flexible pad-like structure that produces uniform heating over its surface. This integrated system heats the water in a water bed to a preselected temperature and keeps it at the selected temperature. Electrostatic shielding of circuitry components is capacitative to avoid capacitive coupling problems inherent in having electrical circuitry adjacent to a large body of water.

9 Claims, 7 Drawing Figures

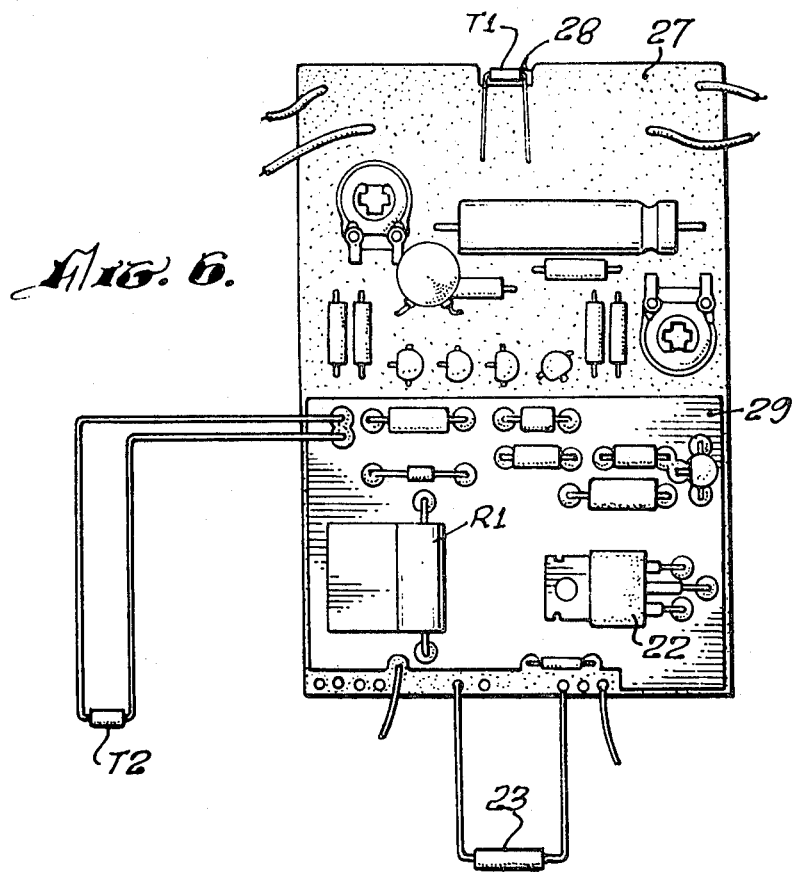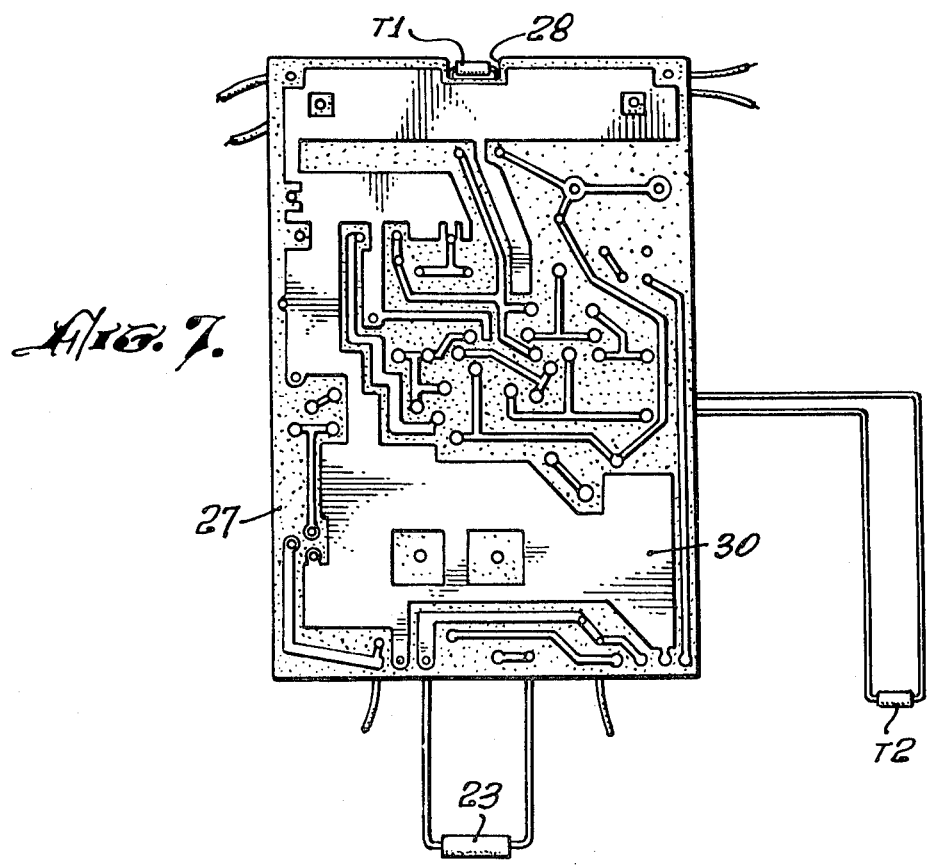

HEATER AND CONTROL SYSTEM

REFERENCE TO RELATED APPLICATIONS

This is an improvement upon my heater control system of my U.S. Pat. No. 3,819,905 issued June 24, 1974.

The present invention relates to a heater and heater control system for heating water beds. The usual water bed has a water-filled bladder with a heater situated beneath it to heat the water to a temperature that is comfortable to the human body. The heater must be turned on and off intermittantly to maintain the water temperature at a desired temperature. A control system is utilized to turn the heater on and off. The control system must, of course, be able to detect the water temperature.

Prior systems for heating water bed bladders all have the disadvantage of having at least two separate units, that is, a control system and a heater. The prior systems fall into two categories, those using a temperature sensitive liquid, and those using temperature sensitive electronic elements. The "liquid" type uses the temperature sensitive expansion characteristics of a liquid to activate a switch that turns the heater on and off. The liquid is contained in a metal bulb positioned under the water bed bladder, and it is connected by a long, thin copper tube to a control box. Due to the fragile nature of the tubing, the control box must be attached to the bed frame to minimize tube flexing. If the tube ruptures or leaks, the control is inoperative. The temperature adjustment resolution of this type of control is very poor, its durability is poor, and its operating action produces loud clicks. Further, its operation produces sparks, which can be dangerous in a high-oxygen, hospital environment.

The type of control system that uses temperature sensitive electronic components utilizes a temperature sensitive electrical element that is placed under the water bed bladder and connected by electrical cord to a control box. The power supply control circuitry in the control box must dissipate the heat it generates into the air. As a result the control box is undesireable in its size and structure. This type of control box is either attached to the bed frame or hung directly on an electrical wall outlet.

An advance in the latter type of system was made by the heater control system set forth in my U.S. Pat. No. 3,819,905 which was issued June 25, 1974. But even in that advanced system, the control box or package was separated from, and not a part of, the heater package itself. The problem has always been the difficulty of placing in one structural package a heater to heat the water, and temperature sensing circuitry to detect the temperature of the water and yet not be affected by the immediate proximity of the heater, all in a package that can be slipped beneath a water bed bladder.

SUMMARY OF THE INVENTION

The present invention solves these problems by its unique structure. The heater is a flat flexible pancake-like structure envelope comprised of thin diameter heating wires sandwiched between two oxide-flame retardant pieces of plastic. Uniform heating over the surface of the heater is achieved by the coils of the heating wire being spaced very close together, and the use of a single continuous strand of wire hundreds of feet in length. The flexibility of the heater is effected by the use of a flexible adhesive between the two pieces of plastic. The objectionable audio hum of the usual magnetostrive heating wire is avoided by the use of aluminum wire. The watts of heating per square inch of heater surface must be kept low enough to avoid temperatures that would damage or burn holes in the water bed bladder, or cause burns to humans, and at the same time transfer enough heat energy to the water in the bladder to heat the water to the desired temperature. This is achieved by having a large surface area on the heater.

The electrical control circuitry is encapsulated in a flat package and positioned between the two plastic sheets of the heater right along with the heating element or wire. The electrical circuitry and its packaging is essentially that as shown in previously mentioned U.S. Pat. No. 3,819,905, but modified in several important respects. One of the modifications is the insertion of "Over Temperature Control Circuitry" the function of which is to prevent the heater from reaching a dangerous temperature under any condition, and to permit demonstration of the system to prospective customers outside of a water bed. The present system, when electrically plugged in and the heater operating, can be safely handled by humans in their bare hands. The instructions provided by manufacturers of prior water bed heaters contain strict warnings against connecting their heaters to electrical outlets until they are properly installed and the water bed filled.

Another modification is the use of a temperature sensitive fuse in the circuitry, situated so as to sense temperature of the heater and the control circuitry. If some component should fail and produce a condition where the heater constantly remains "on", or a condition that causes the control circuitry to overheat, the fuse will disconnect everything from the exterior electrical power supply and the unit will be shut off.

Another aspect of the invention is the manner in which heat sinks are utilized to thermally isolate temperature sensing components and to control overheating of electrical control circuitry. Still other features and advantages of the present invention will become apparent from the detailed description of the invention and the accompanying drawings, wherein:

BRIEF DESCRIPTION OF THE DRAWINGS

FIG. 6 is a view of the component side, or bottom side, of the electrical control circuitry components as they are actually located on an electronic circuit board. Encapsulating filler material normally surrounding this circuitry is omitted to permit viewing of the component arrangement; and FIG. 7 is a top view of the structure shown in FIG. 6, illustrating and showing heat sinks on the circuit board.

DESCRIPTION OF THE PREFERRED EMBODIMENT

Figure 1:
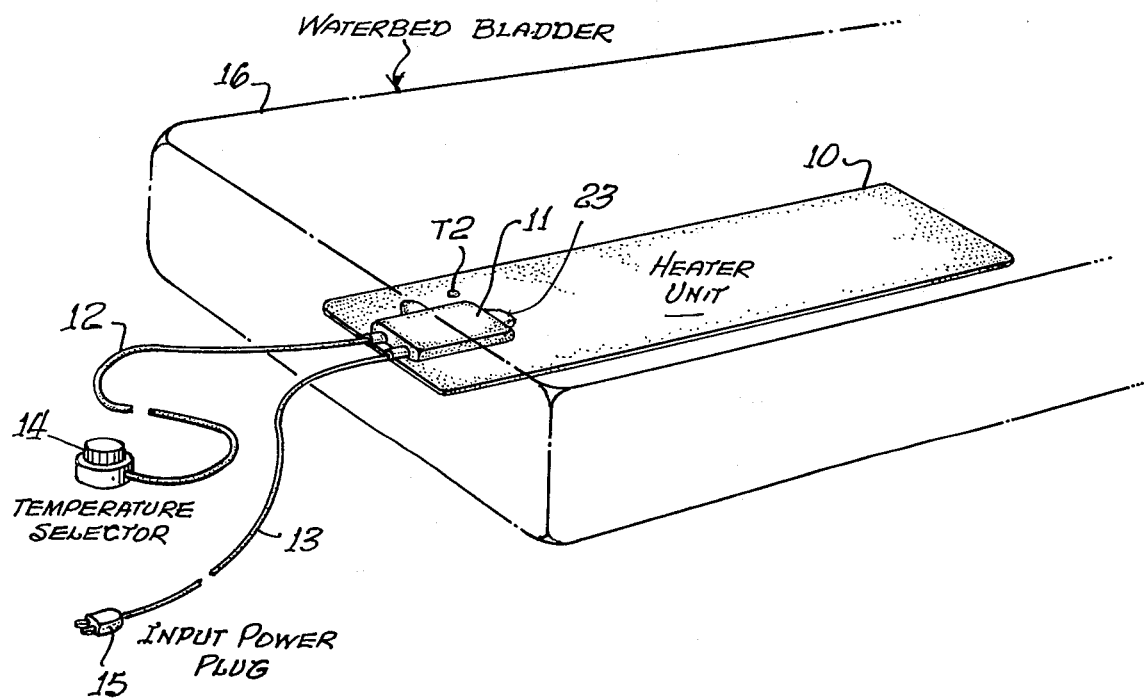
FIG. 1 is a perspective view of the exterior of the Heater and Control System, with a water bed bladder shown in phantom outline.

Referring more particularly to the drawings, FIG. 1 shows a heater unit 10 with control circuitry encapsulated therein and designated by the numeral 11. Two electrical leads 12 and 13 emanate from the control circuitry capsule or package. Lead 12 is connected to a temperature selector 14 which in a preferred embodiment is a potentiometer. Lead 13 is the electrical input power line, terminating in a plug 15 adapted for use with standard 110 volt 60 cycle electrical outlets. The Heater and Control System is shown positioned beneath a water bed bladder 16 filled with water, illustrated in phantom outline.

Figure 2:
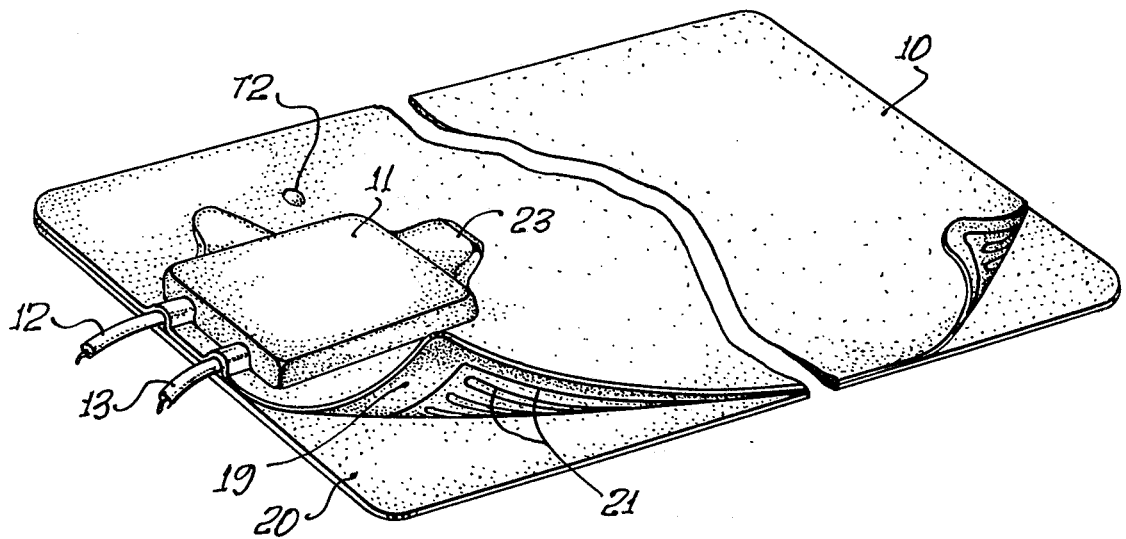
FIG. 2 is a perspective view of the exterior of the Heater and Control System, with a portion of the heater omitted by breakaway to shorten the length of the illustration, and with the top of the heater peeled up at two corners to show the coils of the heating wire.

As illustrated in FIG. 2, the heater unit 10 is comprised of an upper sheet of plastic 19, a lower sheet of plastic 20, forming a structure envelope, and coils or strands of heater wire 21 sandwiched between the sheets of plastic. The preferred plastic is "Noryl", a polyphenalyne oxide-flame retardant plastic made by General Electric Company. Since the unit is used beneath a water bed bladder it is most desirable that it be flexible. To facilitate this, a flexible adhesive is used to bond sheets 19 and 20 together, and secure the heating element wire 21 in place. The preferred adhesive is a urathane system "JR-190" made by Chomerics-Job Ready Company of Irvine, California.

Figure 4:
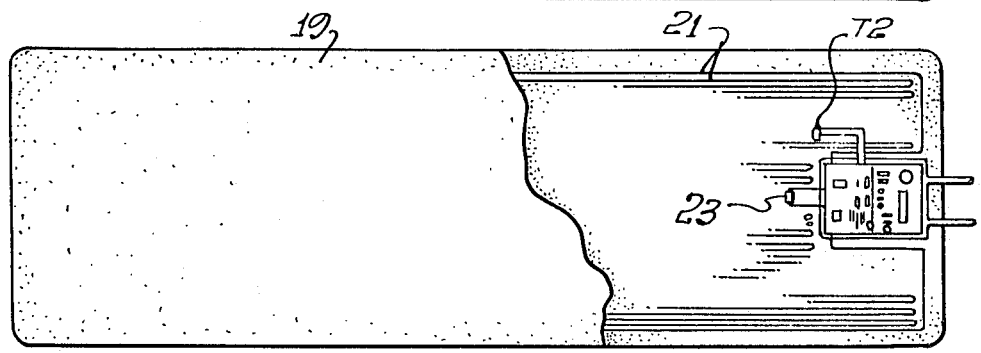
FIG. 4 is a view of the top of the Heater and Control System with the top layer or piece of plastic removed over a portion of the unit to expose the heating element wiring or coils and the control circuitry.

The heater unit 10 is designed to produce uniform heating over its surface area. To produce this effect, one continuous length of heater wire 21 is used, hundreds of feet long, with a spacing between the strands of approximately one tenth of an inch, as illustrated in FIG. 2 and 4. The heater wire must also be flexible, and preferrably not produce the audible hum of the usual magnetostrictive heating wire. To satisfy all these requirements the heater wire 21 is, in the preferred embodiment, made of 28 gauge aluminum wire.

Figure 5:
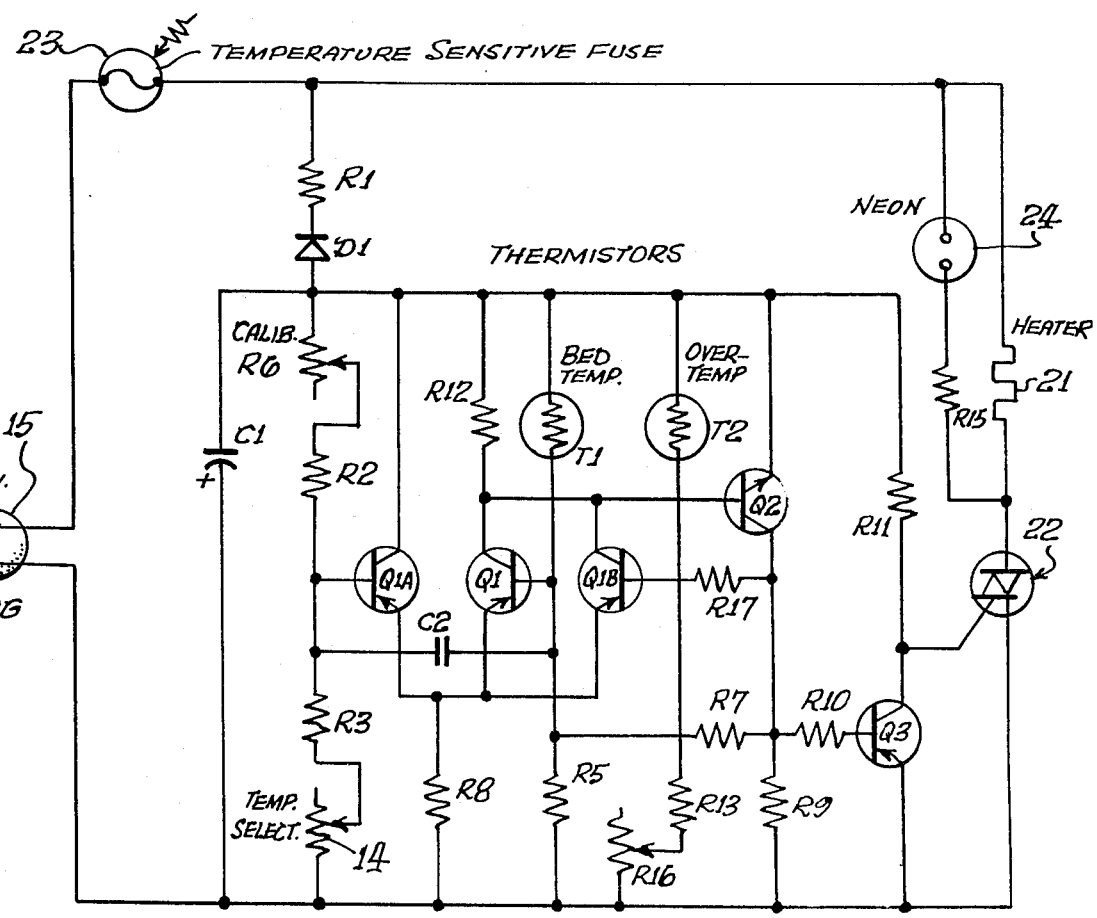
FIG. 5 is a schematic of the electronic circuitry of the invention.

The electrical control circuitry 11 is also positioned between upper and lower sheets of plastic 19 and 20. A schematic diagram of the preferred circuitry is shown in FIG. 5. The circuitry is comprised of power supply circuitry, temperature sensing circuitry to sense water bed bladder temperature, and over temperature control circuitry. Referring to FIG. 5, the power supply circuitry includes a power supply resistor R1, diode D1, and capacitor C1. The function of the power supply control circuitry is to control the electrical power fed to and utilized by the temperature sensing circuitry and the over temperature control circuitry.

The temperature sensing circuitry is a balanced bridge circuit with one side of the bridge being variable resistor R6, resistors R2 and R3, and potentiometer 14. The other side of the bride circuit consists of thermistor T1 and resistor R5. The thermistor T1 is the temperature sensitive element that detects the temperature of the water bed bladder. The output of the bridge circuit is amplified by standard transistor amplifier circuitry, with transistors Q1A, Q1, Q2, Q3, and resistors R7 through R12 as shown. The output from the amplification stages is fed to a switch 22. In the preferred embodiment the switch is a bilateral silicon controlled rectifier. One such switch is the "Triac" manufactured by the ECC Corporation of Euless, Texas.

The power supply resistor R1, in reducing line voltage supplied to the rest of the circuitry, produces a considerable amount of heat, so it is necessary to thermally isolate this resistor from thermistor T1 since the function of the thermistor T1 is to accurately sense the temperature of the water bed bladder. How this is done will be discussed later.

The over temperature control circuitry is comprised of a thermistor T2, resistor R13, variable resistor R16, transistor Q1B and resistor R17. The thermistor T2 is used to sense the heater temperature and is physically positioned in the heating unit to perform that function at a location such as indicated by the designation T2 shown in FIGS. 1 and 2. The body of thermistor T2 is epoxied into a small hump in the top plastic sheet 19 of the heater unit.

Referring to FIG. 5, the thermistor T2 is utilized in the circuit in a manner similar to thermistor T1, the water temperature sensing element. Transistor Q1B is connected to the bridge circuit consisting of T2, R13 and R16. The emitter and collector of Q1B are connected to the emitter and collector respectively of transistor Q1 to form an "or" circuit. This means that either the action of Q1 as controlled by T1 (water temperature) or the action of Q1B as controlled by T2 (heater temperature) can activate switch 22 to turn off the heater wire 21.

Accordingly, when the entire unit is being displayed in a retail store for sales purposes, on a counter top, it can safely be plugged into an electricial outlet. Thermistor T1, sensing a normal room temperature will, in cooperation with transistor Q1, operate to turn switch 22 on and permit heater wire 21 to heat up. Thermistor T2, being physically located in the strands of heating wire 22, will cooperate with transistor Q1B and turn off heating wire 22 when it starts to overheat because of the lack of an adjacent water bed to carry away the heat.

As a result, the unit can be safely held in a persons hands at all times, a feature not available in other water bed heaters.

In adusting the over temperature control circuitry, variable resistor R16 is utilized. The primary consideration in adjusting R16 is that in normal operation, with the heater warming up a cold water bed bladder, the heater should be on continuously until the desired water temperature has been reached. If R16 is adjusted for too low a temperature, the heater will shut off periodically, extending the time required to heat the bed. If R16 is adjusted for too high a temperature the heater will get hotter than desired when operated away from the water bladder, such as on a counter top. For these reasons, proper adjustment of R16 is necessary for the best compromise performance.

In addition to the over temperature control circuitry, the control system has a temperature sensitive fuse 23 in the input power line, shown in FIG. 5. The fuse 23 is physically located so as to detect the heat being generated by the heater strands or coils 21, as indicated by the numeral 23 in FIGS. 1, 2, and 4. If some component of the circuitry should fail, the heater might be held in the on condition and produce continual heating over an extended period of time. Such unwanted heating will activate the fuse 23 and disconnect the power supply source from the heater and the rest of the circuitry. Should there be a failure in the circuitry producing a condition that holds the heater off, then no harm will result, except the water bed bladder will not be heated.

The fuse used in the preferred embodiment is a thermal fuse called a "Microtemp Limiter" manufactured by Micro Devices Corporation of Dayton, Ohio.

A final refinement in the electrical control circuitry is the insertion of a neon light 24, with appropriate resistor R15, in the input power supply line, as shown in FIG. 5. When the heater is on the light 24 is on. When the heater is off the light 24 is off. The neon light is physically located within the shell of potentiometer 14 shown in FIG. 1, permitting a user to visually determine when the heater is on or off. By having this light on the same assembly as potentiometer 14, capacitative coupling occurs between the alternating current circuit of light 24 and the direct current circuit of potentiometer 14. To prevent this coupling from causing electrical chatter, capacitor C2 is inserted in the circuitry as shown in FIG. 5.

The power supply circuitry, temperature sensing circuitry, and over temperature control circuitry, is physically mounted on an electronic circuit board 27 as shown in FIGS. 6 and 7. FIG. 6 is a view of the component side of the circuit board, which side faces away from the water bed bladder. To facilitate thermistor T1 detection of the temperature of the water bed bladder, the circuit board 27 is notched at location 28 and the thermistor T1 is disposed upward into the notch. On this circuit board there are components that produce heat, and which components must be thermally isolated from the temperature sensitive thermistor T1. The major heat producing components are power supply resistor R1 and switch 22, which are placed at the end of the circuit board away from T1. Resistor R1 and switch 22 are firmly secured to a metal plate 29 which acts as a heat sink to spread out the heat generated by these two components. The metal plate 29 is secured to the circuit board 27 which is made of a glass-epoxy laminate about 1/16th of an inch in thickness. The glass-epoxy circuit board conducts heat away from plate 29 to the top of the circuit board and another metal plate or heat sink 30 shown in FIG. 7. Heat sink 30 is separated from the water bed bladder only by plastic sheet 19, the upper plastic sheet shown in FIG. 2. The heat of plate 30 is accordingly transmitted through plastic sheet 19 to the water in the water bed, a hugh heat sink in itself. By this means the thermistor T1 is thermally isolated from the heat producing components of the circuitry, and thermistor T1 senses only the temperature of the water bed bladder.

Figure 3:
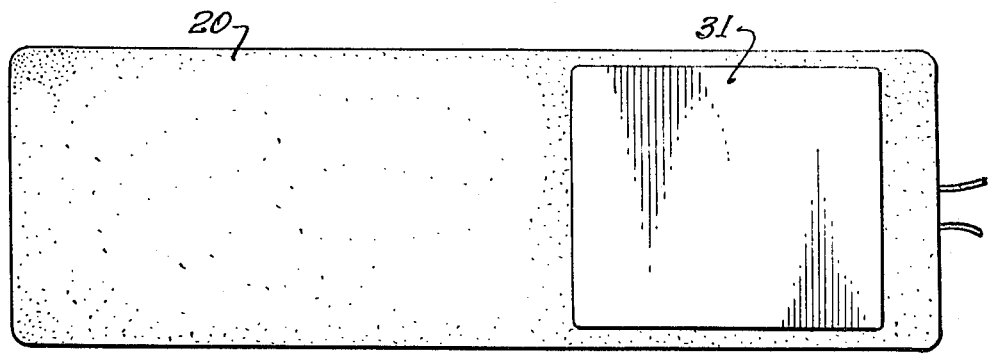
FIG. 3 is a view of the bottom of the Heater and Control System, showing a piece of aluminum foil the function of which is to act as a heat dissipator under certain conditions.

Still another heat sink is provided in the form of a thin sheet of metal, preferrably aluminum foil, disposed on the exterior of the bottom plastic sheet 20, which heat sink is designated by numeral 31 in FIG. 3. If a water bed is drained, and the user forgets to unplug this heater and control system from the 110 volt 60 cycle power supply, the over temperature control circuitry will turn the heater off. However, the control ciricuitry will continue to operate and there will be no water to carry off the heat from the heat producing components thereof. The large heat sink 31 on the bottom of the unit, positioned just below the control circuitry, will perform this function and prevent overheating by rapidly spreading the heat over the now unheated surface of the heater. This heat sink serves a second function by providing a surface on which instructions for installation and use of heater can be printed.

In the assembly process of putting the control system and the heater in the same structure, the electronic circuit board shown in FIGS. 6 and 7 is encapsulated in an appropriate material, which filler material must be a dielectric, impermeable to water and air, and thermally conductive. Epoxy-glass type fillers, or mixtures of resin and sand, and other similar potting compounds meet these requirements. When the circuit board is encapsulated and sandwiched between the top and bottom plastic sheets 19 and 20, as shown in FIG. 2, a raised bump indicated by numeral 11 in FIG. 2 is the resultant exterior view. There is no bump or distortion of lower plastic sheet 20.

When the heater and control system are placed beneath a water bed bladder then the electronic circuit board is separated from the water of the water bed by only a very small distance. This results in electrical capacitative coupling between the control circuitry and the water, since water is an excellent electrical conductor. To eliminate this undesired effect the metal heat sink 30 shown in FIG. 7 is electrically grounded. Since the metal heat sink 30 lies between the electrical control circuitry and the water, its grounding serves to electrically shield the control circuitry.

To summarize the operation of the invention, the unit is placed beneath a filled water bed bladder as shown in FIG. 1, with the input power plug 15 plugged into a standard 110 volt 60 cycle outlet. The desired temperature is then selected on the temperature selecting potentiometer 14, generally a temperature in the range of 82°F to 96°F. The temperature sensing circuitry turns switch 22 on and the heating element heats the water bed bladder and the water therein. When the selected temperature is reached switch 22 is turned off and the heater is turned off. A short while later, as the water cools off a very little, less than 2/10 of one degree farenheit, the heater is turned back on. This intermittant heating continues as long as the unit is plugged in, and maintains the water temperature at the selected temperature. Each time the heater is on, the neon light in the potentiometer assembly 14 is on also. When the heater is off, the light is off.

Should the water bladder break or be drained, and the unit remain plugged into the 110 volt power supply, the heater will be automatically shut off. Also, when the unit is being demonstrated for sale purposes, away from a water bed bladder, the over temperature control system keeps the heater from overheating and makes the unit safe to handle.

The unit is completely waterproof and it is also safe for use in oxygen environments such as hospitals. The flexibility of the unit prevents heater breakage, and makes it ideally suited for use beneath a water bed bladder. There is no noise produced by the unit so a user's sleep is undisturbed.

Although specific embodiments of the present invention have been described and illustrated, it is to be understood that the same are by way of illustration and example, and are not intended as limitations of the invention, the delineation of which is the purpose of the following claims:

I claim:

1. A combined heater, control circuit and power supply for water beds comprising;
    a pair of elongated planar dielectric flexible members in bonded engagement on adjacent faces;
    an electrical heating element between said members substantially covering one face of one of said flexible members except for a local region;
    a circuit assembly positioned between said members in said localized region including a power supply adapted to be connected to the source of electrical current;

said circuit assembly including switch means for applying and interrupting electrical cuurrent to said heating element;

said circuit assembly means also including temperature sensing and control circuitry secured to said circuit assembly including a first temperature sensor positioned in thermal conductive relationship with a face of one of said members whereby the temperature of a body adjacent thereto may be sensed;

a second temperature sensor electrically connected to said circuit assembly extending off said circuit assembly and in thermal conduction relationship with said heating element; and circuit means responsive to either said first or second temperature sensor to operate said switching means;

said circuit assembly and heating element being secured into a sealed unitary assembly between said members.

2. The combination in accordance with claim 1 wherein a thermally conductive member of sufficient area to continuously dissipate heat from said power source in the absence of an adjacent heat absorbing body is secured to the outer surface of one of said members.

3. The combination in accordance with claim 1 including manual control means for setting a predetermined desired temperature, said manual control means connected to said circuit assembly by a cable therefrom; and an electrical line cord cable connected to said circuit assembly;

all of the elements of said system except said manual control and cables contained within said sealed unitary assemmbly.

4. The combination in accordance with claim 3 including heat sink means secured to the exterior of one of said sheets in the region of said recess.

5. A combined water bed heater, power supply and temperature control system comprising a first sheet of flexible dielectric water imperious material;

a second sheet of flexible dielectric water impervious material overlying said first sheet;

said first and second sheets in bonded engagement on adjacent faces thereby comprising an elongated superimposed planar flexible assembly;

a continuous electrical resistance element extending in repetitive paths about a major portion of the planar surface area of the adjacent faces of said first and second sheets except for a localized region;

one of said sheets having an internal recess portion in said localized region with means for communicating between the recess and the edge for electrical cables to said assembly in said recess;

switching means for controlling the period of current applied to said resistance element;

temperature control circuit means for controlling the operation of said switching means, said temperature control circuit means including a first temperature sensitive element positioned to respond principally to temperatures of external bodies adjacent to a surface of one of said sheets;

second temperature sensitive element secured to one of said sheets in the region of a portion of said resistance element to respond to the temperature of said resistance element;

said first and second temperature sensitive elements operatively connected to said switching means to selectively open said switching means when the respective temperature sensing means senses excess of its respective predetermined temperatures;

said switching means and temperature control circuit means selected between said sheets in said recess.

6. The combination in accordance with claim 5 including third temperature sensitive element electrically connected to said power supply and thermally positioned adjacent to said heater element;

said third temperature sensitive element responsive to the sensing of a respective higher temperature than either of the first or second temperature sensitive elements for removing power from said heater.

7. The combination in accordance with claim 6 wherein said third temperature sensitive element is a fuse.

8. The combination in accordance with claim 5 including heat sink means within said recess and in thermal transfer relationship with portions of said temperature control circuit means and one of said sheets.

9. The combination in accordance with claim 6 wherein said first, second and third temperature sensitive elements are electrically connected to said power supply and control circuit but partially thermally isolated therefrom by positioning between said sheets but extending from the edges of said recess.

* * * * *